Mar. 13, 1923.
H. C. WALLACE
STRAW SPREADER
Original Filed Mar. 13, 1920    2 sheets-sheet 1
1,448,644
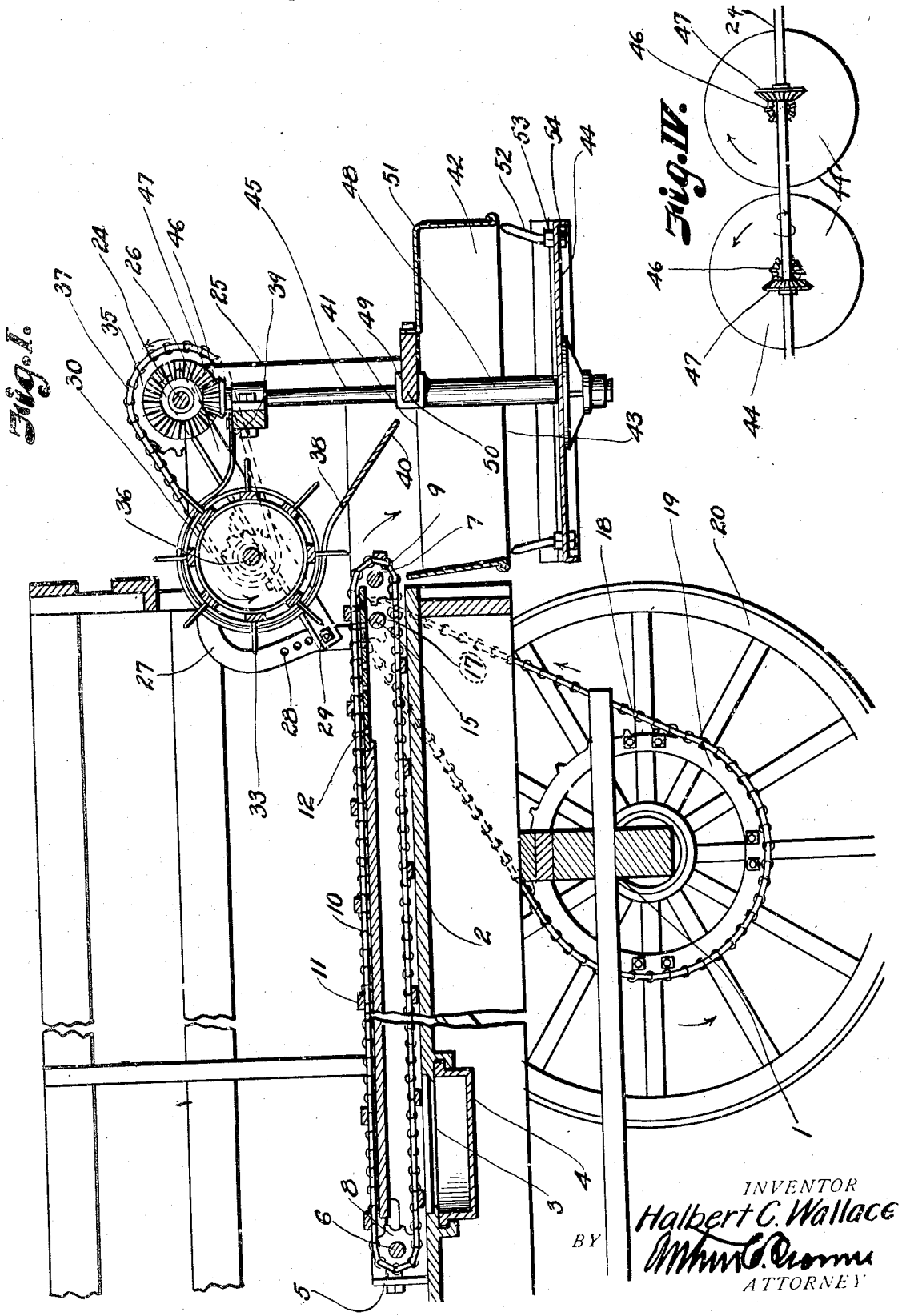
INVENTOR
Halbert C. Wallace
BY
ATTORNEY

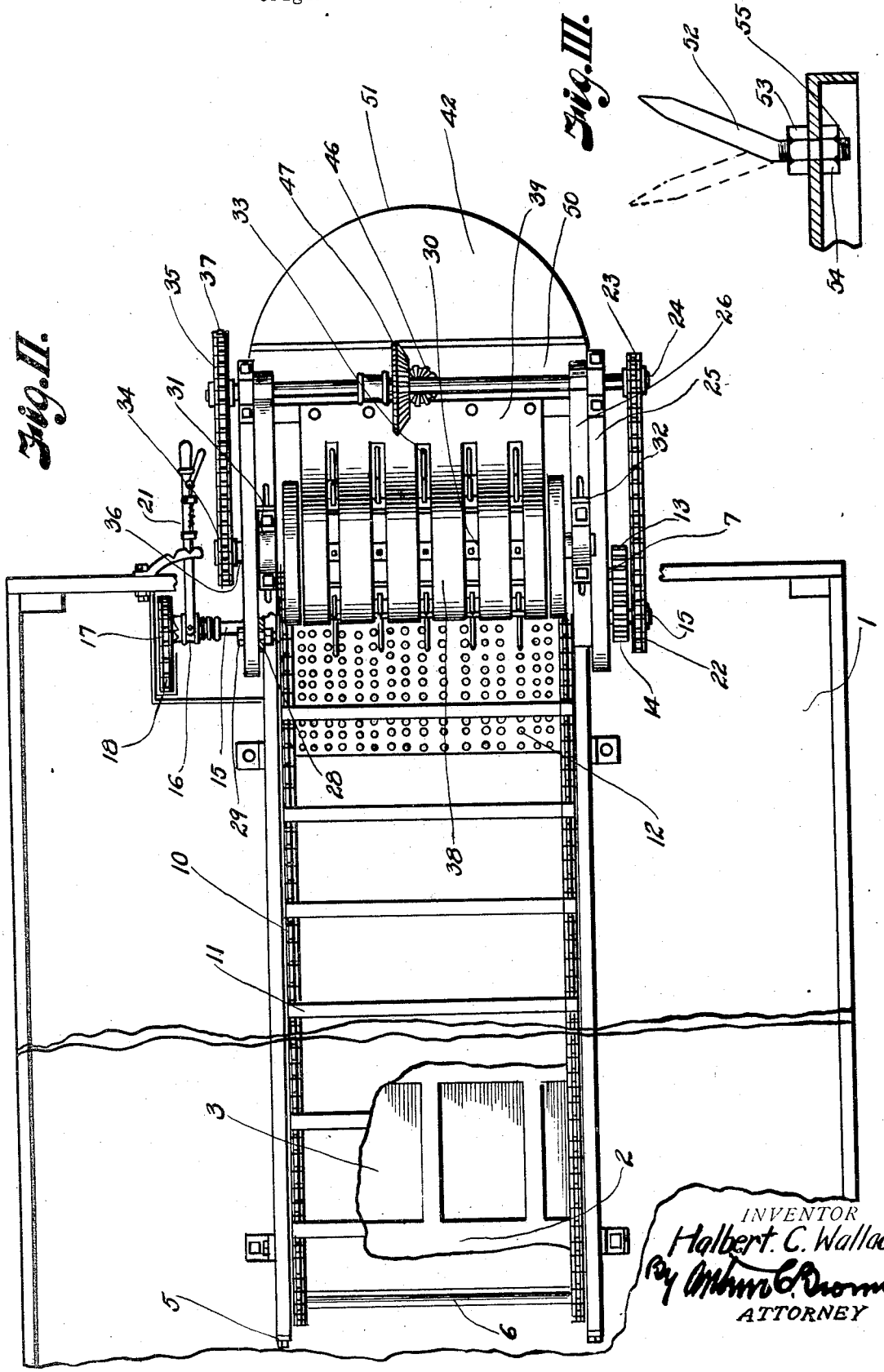

Patented Mar. 13, 1923.

1,448,644

UNITED STATES PATENT OFFICE.

HALBERT C. WALLACE, OF KANSAS CITY, MISSOURI.

STRAW SPREADER.

Application filed March 13, 1920, Serial No. 365,472. Renewed January 10, 1923.

*To all whom it may concern:*

Be it known that I, HALBERT C. WALLACE, a citizen of the United States, residing at Kansas City, in the county of Jackson and State of Missouri, have invented certain new and useful Improvements in Straw Spreaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to straw distributing mechanism and more particularly to a device for distributing straw or the like over the ground to conserve the moisture as well as to fertilize and prevent blowing of the soil.

The invention contemplates the provision of means for feeding the straw or like material to a separator which will disassociate or loosen the straw and then deliver it to a distributor, from which it may be distributed over the ground in an efficient manner.

I have also provided means whereby the feeding, separating and distributing mechanism may operate synchronously with the movement of the vehicle which carries them, the vehicle being adapted to serve as a rack, header barge or wagon without impairing the usefulness of the carrying vehicle for other purposes when the distributing device is removed.

Other objects and advantages of the invention will be apparent by reference to the following description in connection with the accompanying drawings, in which—

Fig. I is a vertical, longitudinal, sectional view through a vehicle contemplated as part of my invention and to which the feeding, separating and distributing mechanism is attached.

Fig. II is a plan view of the same, part of the conveyor being broken away to show the grain receptacle.

Fig. III is a detail view of one of the retarding devices on the distributor, and Fig. IV is a plan view of a slightly modified form of distributor.

Referring now to the drawings by numerals of reference:

1 designates a vehicle which may consist of a farm wagon, hay rack, barge or any suitable vehicle adapted for the purpose intended, and said vehicle is shown as being provided with a bottom 2 having an opening 3 beneath which is a grain receptacle or drawer 4. Extending longitudinally of the vehicle and resting upon the body thereof is a conveyor frame 5 provided with transverse shafts 6 and 7, having sprockets 8 and 9 around which the chains 10 of an endless conveyor pass, the chains 10 being connected by the slats 11, and beneath the upper flight of the conveyor and located near the discharge end thereof is a grain grate or sieve 12, through which the grain from the straw may pass to the bottom 2 of the vehicle and be swept forward to the drawer 4 by the forwardly moving slats 11 on the lower flight of the conveyor, as will be readily understood.

The conveyor is driven from the shaft 7, on which is a gear 13, meshing with the gear 14 on the transverse shaft 15, extending the width of the vehicle and provided at one end with a clutch 16 whereby the shaft 15 may be thrown into and out of engagement with the hub of the sprocket 17, driven by the chain 18 which passes around the sprocket 19 on one of the wheels of the vehicle so that when the wheels, for example, like the one designated 20, pass over the ground, the sprocket 17 will be rotated and if the operator operates the handle 21 to throw the clutch 16 into engagement with the sprocket hub, then the shaft 15 will rotate and, through the gears 13 and 14, rotate the shaft 7 and thereby operate the conveyor to move the straw in a rearward direction.

The shaft 15 carries a sprocket 22 adjacent to the gear 14 and this sprocket is in line with a sprocket 23 on shaft 24, supported by the frame 25 so that when the shaft 15 is being driven from the rear wheels of the vehicle, the shaft 24 will also operate in a direction to impart movement to the separating cylinder so that the straw will be fed rearwardly with respect to the vehicle. The separating cylinder is shown as being carried upon a pivoted frame 26 supported about the shaft 24 and adjustable on the standard 27, which is disposed near the free end of the frame 26 and which is provided with a plurality of openings 28 whereby the frame 26 may be held in any position through the medium of the fastening device 29, shown as a bolt. The cylinder designated 30 is mounted in longitudinally adjustable bearings 31 and 32 so that the cylinder, which consists of a drum, may be moved toward and away from the rear end of the conveyor in a substantially longitudinal direction or raised and lowered to suit different materials fed along by the conveyor or different consistencies of straw, it being understood that some straw is comparatively light and fluffy and other material is matted or wet so that it becomes desirable to adjust the cylinder to take care of the varying conditions encountered.

The cylinder is provided with a plurality of radial teeth or pins 33, which engage the straw or material and disassociate the particles, and if the material happens to be straw containing grain, these teeth or fingers have the effect of loosening the grain kernels so that they will drop upon the grate or grid and pass through the openings therein to the bottom of the vehicle to be carried along forwardly by the conveyor and automatically collected in the drawer 4.

Since the drum or cylinder rotates in a direction to feed the straw rearwardly through the medium of the sprockets 34 and 35 on the cylinder shaft 36 and shaft 24 respectively, it being understood that these sprockets are connected by the chain 37, there might be a tendency for the straw, particularly if wet, to wind about the drum or cylinder, but this will be prevented by the strippers, consisting of the spaced fingers 38 between the rows of teeth or fingers on the spreader cylinder, the strippers being provided by cutting out portions of a metal sheet 39 to provide slots through which the free ends of the teeth may pass, as clearly indicated in Fig. II. The strippers constitute a guard having a downwardly and rearwardly extending apron 40, which projects over the inlet 41 of the hopper 42, carried on the frame 25, said hopper having a discharge opening 43 discharging upon a centrifugally operated, horizontally disposed disk 44, supported on a shaft 45 driven from a beveled gear 46, in mesh with a gear 47 on shaft 24, the ratio of gearing being such that the rotation of the disk 44, which constitutes a straw distributor, will be relatively high.

The shaft 45 is mounted in a bearing 48 which supports the same to maintain the gear 46 in mesh with the gear 47, and the lower portion of the shaft 45 is stabilized by the bearing 49 carried by the cross bar 50, the bearing 49 extending substantially the depth of the hopper and slightly beyond the same and constituting a guard to prevent the straw to be distributed from winding about the shaft 45. It will also be observed that the cross bar 50 supports a rearward hood portion 51 for the hopper so that the material will be fed through the hopper onto the disk and distributed between the bottom of the hopper and the top of the disk. The rate of distribution may be determined by the adjusted position of the teeth or spikes 52, which are slightly bent upon their shanks 53 and which may be swingingly adjusted with respect to the disk through the medium of the fastening devices shown as nuts 54 and 55, the position of the ends of the spikes or teeth 52 determining the space relation between the discharge edge of the hopper and the disk so that the rate of distribution of the material from the disk may be regulated, it being understood that the teeth or projections 52 serve as retarding devices. Therefore, when they are in-bent, as shown in dotted lines in Fig. III, the rate of distribution will be relatively slow, whereas if they are in the position shown in full lines of Fig. III, the rate of distribution will be relatively rapid.

If the device is to be adapted for a relatively narrow wagon or vehicle, a single distributing disk will be employed, but if for a relatively wide conveyor or wagon, a plurality of disks may be employed, such as shown in Fig. IV. In such a construction, 24 designates a horizontal shaft provided with two oppositely disposed gears 47 for two independent gears 46, which, in the usual way described above, will operate the disks 44 so as to rovide a wider range of distribution of the material than would be practicable with the single disk, the essential embodiment of the invention, however, being the same in both cases.

It will be observed that the frame 5 and frame 25 may be secured together as a single construction so that in order to apply the device to a vehicle, it will be only necessary to lay the frame 5 upon the wagon body, securing it in a suitable manner so that the frame 26 is suspended therefrom and by gearing the mechanism to a sprocket removably fastened to the ordinary wheel spokes, the device will be ready for operation. Attention is also called to the fact that the grid or grate may be caused to vibrate if desired, or interchangeable grates of different sizes may be employed but the particular grate mechanism is not considered to be of material importance to the present invention, the salient features of the invention being set forth in the appended claims.

What I claim and desire to secure by Letters Patent is:

1. A straw spreader comprising a conveyor, a straw separator having radial teeth, strippers arranged between the teeth, a guide apron extending below the separator and carried by the strippers, a hopper below the guide apron, and a spreader disk below the hopper.

2. In combination a straw spreader mechanism comprising a conveyor, a rotatable cylinder having teeth for removing straw from the conveyor and a distributor below the cylinder, a stripper comprising fingers extending between the teeth of the cylinder for removing the straw therefrom and a guide apron carried by the fingers for guiding the straw onto the distributor.

In testimony whereof I affix my signature.

HALBERT C. WALLACE.